United States Patent [19]  [11] 3,917,798
Konopik et al.  [45] Nov. 4, 1975

[54] SO₂ ABATEMENT

[75] Inventors: Alvin E. Konopik, Newark, Del.; James D. Kusko, Highland, Ind.

[73] Assignee: E. I. Du Pont de Nemours & Company, Wilmington, Del.

[22] Filed: Sept. 24, 1973

[21] Appl. No.: 400,041

[52] U.S. Cl. .............................. 423/242; 423/522
[51] Int. Cl.² ........................................ C01B 17/00
[58] Field of Search .......................... 423/242–244, 423/522, 531

[56] References Cited
UNITED STATES PATENTS
3,733,393   5/1973   Couillaud et al. ................. 423/242

FOREIGN PATENTS OR APPLICATIONS
930,584     1/1962   United Kingdom ................. 423/242
1,234,912   2/1967   Germany ........................... 423/242
670,966     1/1939   Germany ........................... 423/242

Primary Examiner—Oscar R. Vertiz
Assistant Examiner—Gregory A. Heller

[57] ABSTRACT

The process for removing $SO_2$ from a gas stream with a sulfuric acid solution containing a peroxygen compound and feeding the withdrawn scrubbing solution to a sulfuric acid plant is improved if the withdrawn scrubbing solution is treated to remove any excess peroxygen compound prior to being fed to the acid plant. The excess peroxygen compound can be removed by heating to 100°–150°C. and concentrating to 60–90% by weight $H_2SO_4$ to decompose any residual peroxygen compound present.

3 Claims, No Drawings

$SO_2$ ABATEMENT

BACKGROUND OF THE INVENTION

Gas streams are often formed by the burning of various fuels in various industrial processes, e.g., in electric power generation, the smelting of ores, oil refining, and sulfuric acid and nitric acid manufacture. These streams, which are ultimately deposited into the atmosphere, often include gases, i.e., $SO_2$, which are harmful to living organisms when present in excessive concentrations in their environment.

In order to limit the amount of these oxidizable noxious gases entering the atmosphere and to comply with increasingly stringent governmental regulations, many processes have been proposed for removing them from gas streams. One such process involves the removal of $SO_2$ from flue gases by scrubbing with sulfuric acid as taught in British Pat. No. 930,584, German Pat. Specification No. 1,234,912 and German Patent No. 670,966. These patents teach scrubbing waste gases with an aqueous solution of between 35 and 80% by weight sulfuric acid containing peroxygen compounds, e.g., peroxysulfuric acid and hydrogen peroxide. The fraction of peroxysulfuric acid consumed during the scrubbing is regenerated by passing the used scrubbing solution through an electrolytic cell and regenerating the peroxysulfuric acid by anodic oxidation. The peroxysulfuric acid then partially equilibrates to form relatively small amounts of hydrogen peroxide. After regeneration, the scrubbing solution can be recycled.

An improved process for removing the $SO_2$ from a gas stream is described in Application Ser. No. 314,327, filed Dec. 12, 1972. In this process a gas stream containing $SO_2$ is contacted with an aqueous scrubbing stream of $H_2SO_4$ of about 30 to 60 percent concentration by weight at a temperature of about 25° to 100°C., the stream containing about 0.01 to 25 percent by weight of $H_2O_2$. There is a contact time of about 0.1 to 15 seconds between the $SO_2$ and the $H_2O_2$. The $H_2O_2$ is preformed before addition to the $H_2SO_4$, and the $H_2O_2$ comprising at any given time at least about 90 mole percent of the oxidizing mixture consisting of $H_2O_2$ and the peroxy acids of $H_2SO_4$.

In the processes above, it is necessary to withdraw from the scrubbing system an amount of sulfuric acid equivalent to the amount of $SO_2$ removed from the gas stream. The concentration of the sulfuric acid in the withdrawn solution can range from 30 to 80% by weight sulfuric acid. This concentration of acid has very little commercial use, thus it normally must be concentrated to commercial strengths if it is to be sold. When such scrubbing solutions are added directly to the circulating acid in the drying or absorbing tower in a sulfuric acid plant to increase their concentration, a problem has occurred; the resulting concentrated acid has become discolored, e.g., brown or turbid.

SUMMARY OF THE INVENTION

We have discovered that this problem can be eliminated if any excess peroxygen compound, e.g., hydrogen peroxide or peroxysulfuric acid, present in the withdrawn stream is eliminated prior to feeding the withdrawn stream to a circulating acid stream in a sulfuric acid plant for concentration. In the process the excess peroxygen compound is first removed and the withdrawn stream is thus fed into the circulating acid stream in the drying or absorbing tower of a sulfuric acid plant. In either of these towers the withdrawn stream will be concentrated to commercial strengths.

The peroxygen compounds can be eliminated, with the resulting elimination of discoloration, by reacting the excess peroxygen compound in the stream with $SO_2$ to form sulfuric acid. This can be accomplished by passing the scrubbing solution with the peroxygen compounds countercurrent to a stream of gas containing $SO_2$, employing either a side stream of the $SO_2$ off-gas fed to the abatement process, an $SO_2$ bearing gas stream used in the manufacture of sulfuric acid, or $SO_2$ from cylinders or the like. The $SO_2$ can also be pressurized and injected cocurrent to the withdrawn stream.

In this embodiment the withdrawn stream can be treated under the conditions it leaves the scrubber, i.e., temperatures of 25° to 100°C. and atmospheric pressure. The amount of $SO_2$ to be added will depend upon the amount of excess peroxygen compound present. The withdrawn stream can be monitored by conventional techniques and the feed of $SO_2$ adjusted accordingly.

Preferably, the withdrawn scrubbing stream is treated to thermally decompose the residual peroxygen compound by heating the withdrawn stream to 100°–150°C., preferably 110°–130°C., and concentrating the acid to 60–90%, preferably 70–80%, by weight $H_2SO_4$.

Other methods of removing the excess peroxygen compound will be obvious to those skilled in the art and can be employed in the process of the invention.

The process of the invention has the advantage in that the treated acid can be added directly to the circulating acid in a sulfuric acid plant without creating any offquality acid.

DESCRIPTION OF PREFERRED EMBODIMENTS

In processes for removing $SO_2$ from a gas stream employing an aqueous scrubbing solution of a peroxygen compound in sulfuric acid, an amount of scrubbing solution is withdrawn equivalent to the amount of $SO_2$ removed from the gas stream. This withdrawn stream is then treated to remove any excess peroxygen compound.

In the preferred embodiment the stream is heated to 100° to 150°C. and concentrated to 60 to 90% by weight $H_2SO_4$ to decompose any residual peroxygen compound present. The treated stream can then be concentrated to commercial strengths, 93–99% by weight $H_2SO_4$, by being added to a circulating acid stream and fed into a conventional sulfuric acid drying or absorbing tower.

The decomposition rate of the peroxygen compound is dependent upon temperature and concentration. At concentrations below about 60%, higher temperatures are required to obtain almost complete decomposition within a reasonable period of time. Thus, it is preferred to operate this embodiment at temperatures between 100° and 150°C. and concentrations of 60 to 90% $H_2SO_4$, preferably temperatures of 110°–130°C. and 70–80% $H_2SO_4$.

The necessary temperatures can be obtained by directly heating the stream either by non-contact heat transfer or by adding a hot fluid (steam) directly to the withdrawn stream. The heating is continued until the desired concentration and temperature are obtained.

Preferably, the stream is treated by the addition of a sufficient amount of strong sulfuric acid, e.g., 93–99% by weight. The addition of the strong acid increases the temperature by the heat of dilution and provides the desired concentration.

In view of the differences in specific gravity and viscosity between the withdrawn stream and the strong acid streams, vigorous agitation is usually desirable to obtain intimate mixing of the two streams. This agitation can be obtained by the use of a side tee mixer or the like. By vigorous agitation is meant that usually the energy generated by the flow is about 1.5 horsepower/1000 gallons or more. Of course, under many circumstances, this amount of energy will not be required since a greater residence time will compensate for vigorous agitation.

If a side tee mixer is used, the withdrawn stream can enter the side tee through an eccentric orifice to provide a jetting action as well as swirl. The strong acid flows upward through the run portion of the tee. After mixing in the tee, the acid mixture, at the desired concentration, can be discharged into a vertical pipe. The pipe should be of sufficient height to provide the hold time to permit oxygen disengagement from the acid. The acid level in the pipe is maintained by overflow to an acid pump tank.

The withdrawn stream need only be held at the desired temperature for a short period of time, 3 to 10 minutes is usually sufficient to thermally decompose any residual peroxygen compound present.

This embodiment of the invention can be operated at ambient pressures; however, elevated or reduced pressures could be employed if that is desired. If elevated pressures are employed, temperatures above 150°C. can of course be employed.

The following examples are offered to illustrate the various embodiments of the process of the invention. All parts and percentages are by weight unless otherwise indicated.

EXAMPLE 1

50 ml. of 50% $H_2SO_4$ containing 0.425% peroxygen compound (as $H_2O_2$) is heated to its boiling point, 124°C. Over a period of about 8 minutes the acid concentration increases to 62% $H_2SO_4$ (boiling point 144°C.) and the peroxygen compound is reduced to less than 10 ppm.

The resulting acid can be concentrated to commercial strength in a conventional sulfuric acid plant without any discoloration problem.

EXAMPLE 2

To 50 ml. of 50% $H_2SO_4$ containing 0.5% peroxygen compound (as $H_2O_2$) at a temperature of 40°C. is added with agitation, 50 ml. of 99% $H_2SO_4$ at 75°C. The heat of dilution rapidly raises the temperature to about 120°C. After 1 to 3 minutes the concentration of peroxygen compound is reduced to less than 10 ppm.

The resulting acid can be concentrated to commercial strength in a conventional sulfuric acid plant.

EXAMPLE 3

A solution of 50% sulfuric acid containing 0.5% peroxygen compound is transferred continuously through a pipeline at a rate of 3 gallons per minute. $SO_2$ is injected from cylinders cocurrent to the flow of acid at a rate of 1 to 1.5 SCFM.

The sulfuric acid discharging from the pipeline is completely free of peroxygen compounds and contains a small quantity of unreacted $SO_2$. This acid can be concentrated in a sulfuric acid plant to produce commercial quality acid.

We claim:

1. In the process for removing $SO_2$ from a gas stream by (a) contacting the stream with an aqueous scrubbing liquid containing 30 to 80% by weight sulfuric acid and a minor amount of peroxygen compound, (b) withdrawing a portion of the scrubbing liquid and (c) concentrating it in admixture with the circulating acid stream of a sulfuric acid plant, the improvement comprising removing residual peroxygen compound from the withdrawn scrubbing liquid prior to admixing it with the circulating acid stream by adding with agitation to the withdrawn scrubbing liquid sufficient 93 to 99% by weight sulfuric acid to obtain an admixture having a concentration of 60–90% by weight sulfuric acid and, by heat of dilution, a temperature of 100°–150°C.

2. The process of claim 1 wherein the peroxygen compound is hydrogen peroxide.

3. The process of claim 1 wherein the temperature is 110°–130°C. and the concentration is 70–80% by weight.

* * * * *